United States Patent
Okabe et al.

(10) Patent No.: US 10,442,368 B2
(45) Date of Patent: Oct. 15, 2019

(54) SIDE MIRROR DEVICE FOR VEHICLE

(71) Applicant: HONDA MOTOR CO., LTD., Tokyo (JP)

(72) Inventors: Koji Okabe, Yokohama (JP); Noriyuki Tsutsumi, Sakura (JP); Takaaki Nagai, Utsunomiya (JP); Yuji Horikawa, Utsunomiya (JP); Yoshihiro Maeno, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 82 days.

(21) Appl. No.: 15/539,741

(22) PCT Filed: Dec. 17, 2015

(86) PCT No.: PCT/JP2015/085340
§ 371 (c)(1),
(2) Date: Jun. 26, 2017

(87) PCT Pub. No.: WO2016/125405
PCT Pub. Date: Aug. 11, 2016

(65) Prior Publication Data
US 2018/0009394 A1    Jan. 11, 2018

(30) Foreign Application Priority Data
Feb. 2, 2015    (JP) ................................ 2015-018633

(51) Int. Cl.
*B60R 11/04* (2006.01)
*B60R 1/00* (2006.01)
(Continued)

(52) U.S. Cl.
CPC ............... *B60R 11/04* (2013.01); *B60R 1/00* (2013.01); *B60R 1/06* (2013.01); *B60R 1/12* (2013.01); *G06K 9/00771* (2013.01); *G06K 9/00791* (2013.01); *B60R 2001/1253* (2013.01); *B60R 2011/004* (2013.01); *B60R 2011/0043* (2013.01)

(58) Field of Classification Search
CPC ........................................................ B60R 11/04
See application file for complete search history.

(56) References Cited

U.S. PATENT DOCUMENTS

| 2012/0039082 | A1* | 2/2012 | Rodriguez Barros ....................... B60Q 1/2665 362/494 |
|---|---|---|---|
| 2013/0033604 | A1* | 2/2013 | Ohshima ................. B60R 11/04 348/148 |
| 2015/0195435 | A1 | 7/2015 | Oshida et al. |

FOREIGN PATENT DOCUMENTS

| JP | 2009-006926 | 1/2009 |
|---|---|---|
| JP | 2009-093882 | 4/2009 |

(Continued)

OTHER PUBLICATIONS

International Search Report, dated Mar. 8, 2016 (dated Mar. 8, 2016), 2 pages.

*Primary Examiner* — Jefferey F Harold
*Assistant Examiner* — Justin B Sanders
(74) *Attorney, Agent, or Firm* — Rankin, Hill & Clark LLP (57) ABSTRACT

A recessed portion positioned on a vehicle rear side with respect to a lens of a camera and recessed in an inner side direction from an outer surface of a mirror housing is provided on the mirror housing. A flow rectifying surface, which forms a flow of traveling wind toward the recessed portion, is provided on the mirror housing.

6 Claims, 5 Drawing Sheets

(51) Int. Cl.
*B60R 1/06* (2006.01)
*B60R 1/12* (2006.01)
*G06K 9/00* (2006.01)
*B60R 11/00* (2006.01)

(56) References Cited

FOREIGN PATENT DOCUMENTS

| | | |
|---|---|---|
| JP | 2009-286216 | 12/2009 |
| JP | 2014-061808 | 4/2014 |
| WO | 2014/027587 | 2/2014 |

\* cited by examiner

SIDE MIRROR DEVICE FOR VEHICLE

TECHNICAL FIELD

The present invention relates to a side mirror device for a vehicle.

Priority is claimed on Japanese Patent Application No. 2015-018633, filed on Feb. 2, 2015, the content of which is incorporated herein by reference.

BACKGROUND ART

In a side mirror device mounted on a side portion of a vehicle, a mirror main body which reflects a vehicle rear side is accommodated in an opening on the vehicle rear side of a mirror housing and a vehicle front side of the mirror housing is formed in a convexly curved shape toward a front side. In this type of side mirror device, when water droplets adhere to the mirror housing while the vehicle travels in rain or the like, there is a concern of the water droplets transferred downward along an outer surface of the mirror housing being blown by a traveling wind of the vehicle and introduced into a mirror main body side. Thus, a side mirror device configured to be able to prevent water droplets from being introduced into the mirror main body side when the vehicle travels has been proposed (see Patent Literature 1).

In the side mirror device disclosed in Patent Literature 1, a plurality of protruding walls protruding downward are provided on the mirror housing so that water droplets that adhere to the mirror housing smoothly fall downward along the protruding walls. Thus, water droplets easily fall downward along the protruding walls even when the mirror housing receives a traveling wind when the vehicle travels.

Also, in the side mirror device disclosed in Patent Literature 1, a through hole is provided at a lower end of the mirror housing and a camera capable of imaging the outside of the vehicle is provided in the through hole. In addition, the protruding walls are disposed in the mirror housing at a position on an outer-upper side of the through hole in which the camera is installed. Therefore, in this side mirror device, water droplets can be prevented from being introduced toward the lens of the camera because the protruding walls cause the water droplets to fall even when the water droplets that adhere to the mirror housing flow downward along an outer side surface thereof.

CITATION LIST

Patent Literature

[Patent Literature 1]
Japanese Unexamined Patent Application, First Publication No. 2009-6926

SUMMARY OF INVENTION

Technical Problem

Incidentally, in a side mirror device in which a camera is integrally provided, a lens of the camera may be installed toward a vehicle rear side depending on an imaging range needed.

In this case, even when a protruding wall which causes water droplets to fall is formed on an outer side surface of a mirror housing as in the side mirror device disclosed in Patent Literature 1, there is a concern of the water droplets that adhere to the mirror housing being blown by a traveling wind of the vehicle and introduced toward a lens area of the camera.

Particularly, when a recessed portion recessed in an inner side direction of the mirror housing is at a position on the vehicle rear side with respect to the lens of the camera in the outer side surface of the mirror housing, the recessed portion easily becomes a retention portion of the traveling wind. When the retention portion is on the outer side surface of the mirror housing, a vortex which hinders separation of an air current in the lens area is easily generated. Therefore, the water droplets may be easily introduced toward the lens area of the camera due to the vortex generated at the above-described position.

An aspect according to the present invention has been made in view of the above-described problem and an objective of the present invention is to provide a side mirror device for a vehicle capable of suppressing water droplets from being introduced toward a lens area of a camera when the vehicle travels even when a recessed portion recessed in an inner side direction of a mirror housing is on the vehicle rear side with respect to the lens of the camera installed toward the vehicle rear side.

Solution to Problem

In order to resolve the above-described problems and achieve the objectives, the present invention adopts the following aspects.

(1) According to an aspect of the present invention, there is provided a side mirror device for a vehicle including a mirror main body which reflects a vehicle rear side, a mirror housing disposed on a side portion of an outer side of the vehicle and having an opening opened toward the vehicle rear side to accommodate the mirror main body, and a camera disposed in a camera installation portion provided on the mirror housing and configured to image the outside of the vehicle through a lens directed toward the vehicle rear side, wherein a recessed portion positioned on the vehicle rear side with respect to the lens and recessed in an inner side direction from an outer surface of the mirror housing is provided on the mirror housing, and a flow rectifying portion which forms a flow of traveling wind toward the recessed portion is provided on the mirror housing.

According to the configuration of (1) described above, since a flow of a vigorous traveling wind toward the recessed portion via the flow rectifying portion of the mirror housing can be formed when the vehicle travels, retention of the traveling wind at the recessed portion positioned on the vehicle rear side with respect to the lens cannot easily occur. Therefore, a vortex around the recessed portion cannot be easily generated and an air current of the traveling wind is easily separated at a peripheral region of the lens when the vehicle travels. Accordingly, it becomes difficult for water droplets that adhere to the mirror housing to be introduced toward a lens area when the vehicle travels.

(2) In the aspect (1), the camera installation portion may be formed to be continuous with an outer wall of a lower region of the housing main body of the mirror housing, and the flow rectifying portion may include a flow rectifying surface having a width substantially parallel to a vehicle width direction and extending substantially in a vehicle longitudinal direction on an upper side with respect to the lens.

In the case of (2) described above, although the water droplets that flow downward along the housing main body of the mirror housing may be introduced toward the camera installation portion which is continuous with the outer wall of the housing main body, since the flow rectifying surface is provided on the upper side with respect to the lens of the camera, the traveling wind of the vehicle flows along the flow rectifying surface. Thus, it is possible to prevent the water droplets that flow down from the housing main body from being introduced toward the lens by the flow of the traveling wind along the flow rectifying surface which is on the upper side with respect to the lens.

(3) In the aspect (2), the camera installation portion may be provided to bulge to an outer side in the vehicle width direction from the outer wall of the lower region of the housing main body of the mirror housing, the flow rectifying surface having a width substantially parallel to the vehicle width direction and extending substantially in the vehicle longitudinal direction may be provided on an upper portion of a bulging portion of the camera installation portion, and an eave portion extending toward the vehicle rear side with respect to the lens may be provided at a rear end portion of the bulging portion which forms the flow rectifying surface.

In the case of (3) described above, since the eave portion provided on the upper portion of the bulging portion of the camera installation portion extends toward the vehicle rear side with respect to the lens, an air current of traveling wind can be more efficiently separated from the vicinity of the lens by the eave portion and it is possible to prevent the water droplets that fall from the camera installation portion when the vehicle is stopped from adhering to the lens due to the eave portion.

(4) In the aspect of (3), the mirror housing may include an opening cover wall which forms a peripheral edge portion of the opening and a groove portion adjacent to a vehicle front side of the opening cover wall and configured to extend substantially in a vertical direction, and a rear end portion of the eave portion may extend to a downward-extending position of the groove portion.

In the case of (4) described above, the water droplets that flow downward along the groove portion of the mirror housing can be effectively prevented from being introduced toward the lens by the eave portion.

(5) In any one of the aspects (2) to (4), the flow rectifying surface may be constituted with an inclined surface inclined upward toward the vehicle rear side.

In the case of (5) described above, when a traveling wind flows along the flow rectifying surface when the vehicle travels, since the flow is directed toward an inclined upper side, water droplets flowing down from an upper side of the mirror housing can be blown in a direction away from the lens and an air current of the traveling wind can be more efficiently separated from the vicinity of the lens.

Advantageous Effects of Invention

According to the aspect of the present invention, since a flow rectifying portion forming a flow of traveling wind toward a recessed portion is provided on a mirror housing and thereby an air current of the traveling wind is easily separated at a peripheral region of a lens, water droplets introduced toward the lens area of the camera when the vehicle travels can be suppressed.

DESCRIPTION OF EMBODIMENTS

Hereinafter, embodiments of the present invention will be described based on the accompanying drawings. In the following description, the terms "front/rear" or "up/down" mean "front/rear" or "up/down" in a state in which it is mounted on a vehicle unless otherwise specified. In addition, common components of the embodiments will be denoted by the same reference signs and duplicate description thereof will be omitted.

First, a first embodiment illustrated in FIGS. 1 and 2 will be described.

Figure 1:
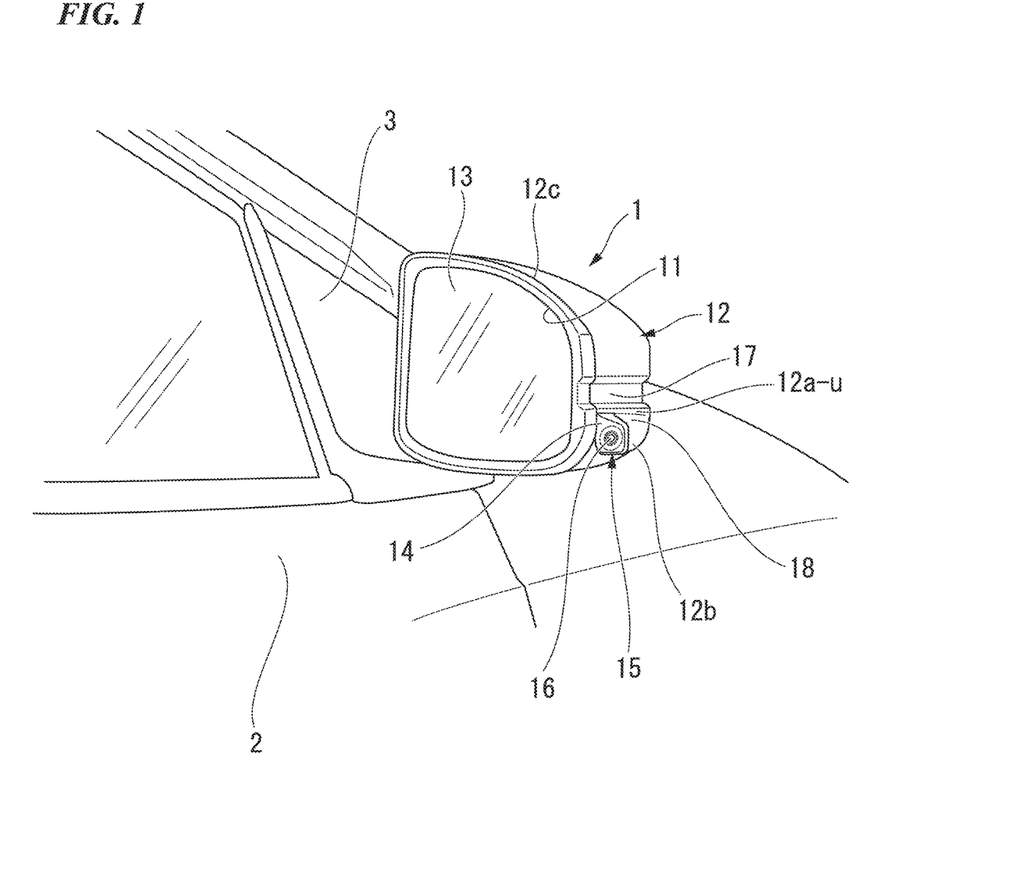
FIG. 1 is a perspective view of a vehicle on which a side mirror device according to a first embodiment of the present invention is mounted.
Figure 2:
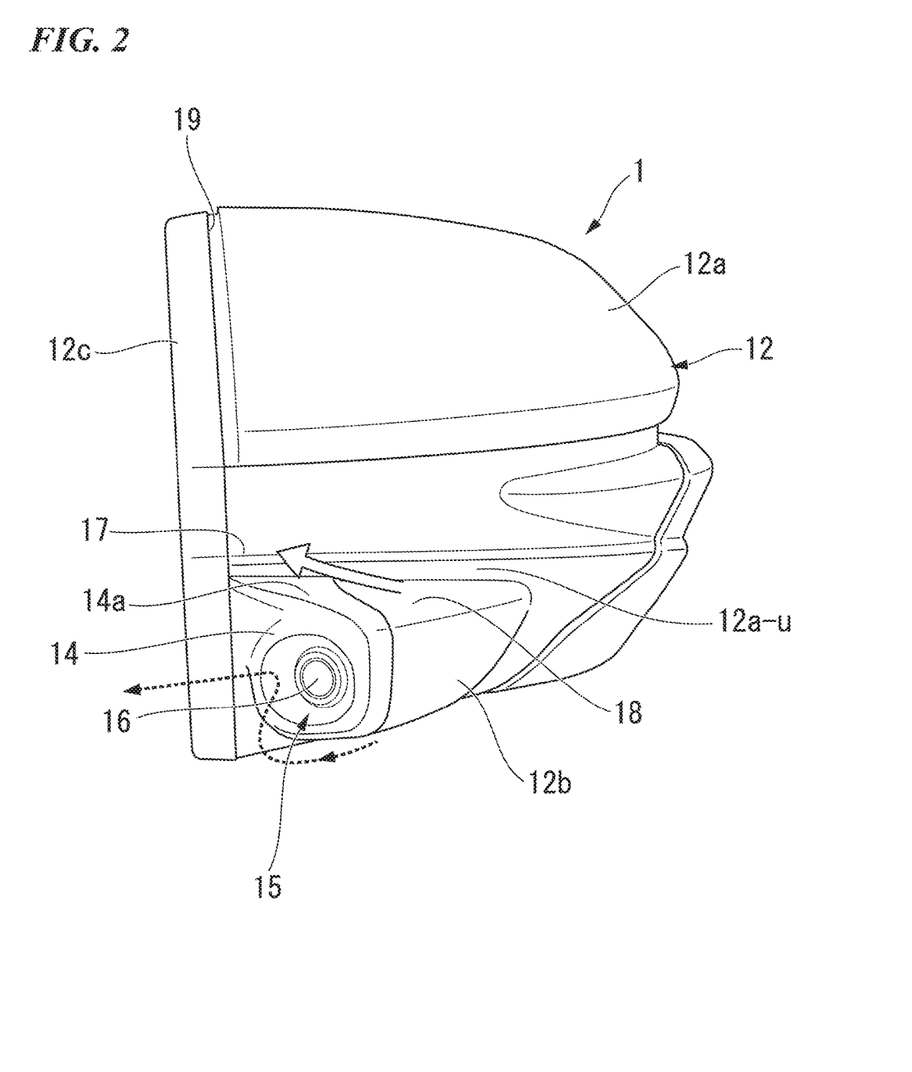
FIG. 2 is a side view of a side mirror device according to the first embodiment of the present invention.

FIG. 1 is a view illustrating a state in which a side mirror device 1 according to the embodiment is mounted on a vehicle body, and FIG. 2 is a view illustrating a side surface of the side mirror device 1.

The side mirror device 1 according to the embodiment is mounted on a mounting base 3 at a front portion of a side door 2 of the vehicle to be tiltable in forward and backward directions.

The side mirror device 1 includes a mirror housing 12 having an opening 11 which is opened toward a vehicle rear side and a mirror main body 13 (a mirror body) disposed to be tiltably adjustable in the opening 11 of the mirror housing 12 to reflect the vehicle rear side for passengers inside the vehicle. The mirror housing 12 is formed in a curved shape protruding toward a vehicle front side. In addition, the mirror housing 12 includes a housing main body 12a in which a holding mechanism (not shown) of the mirror main body 13 and a tilting mechanism (not shown) of the side mirror device 1 with respect to the mounting base 3 are embedded, a camera installation portion 12b that bulges toward the outside in a vehicle width direction from an outer wall of a lower region 12a-u of the housing main body 12a, and a visor 12c (an opening cover wall) fitted and fixed to an edge portion of a rear end side of the housing main body 12a to form a peripheral edge portion of the opening 11.

A camera 15 for imaging a rear-side portion of the vehicle is installed in the camera installation portion 12b. A lens installation portion 14 in a concave shape which is directed toward the rear-side portion of the vehicle is provided at a rear end portion of the camera installation portion 12b and a lens 16 of the camera 15 which is directed toward an imaging region of the rear-side portion of the vehicle is disposed at a center of the lens installation portion 14. Image data captured by the camera 15 can be used in various safety devices, warning devices, or the like of the vehicle.

Also, a recessed groove 17 (a recessed portion) is continuously formed at substantially a center in a vertical direction of the visor 12c and the housing main body 12a to straddle from outer side surfaces thereof to a front surface. The recessed groove 17 is formed substantially horizontally on the outer surface of the visor 12c and housing main body 12a. A turn signal lamp, a garnish, and the like, which are not illustrated, are appropriately mounted in the recessed groove 17. In the case of this embodiment, a rear side region of the recessed groove 17 constitutes a recessed portion recessed in an inner side direction from the outer surface of the mirror housing 12 at a position on the vehicle rear side with respect to the lens 16.

Here, the above-described camera installation portion 12b is provided close to a position under the recessed groove 17 on an outer side surface of the mirror housing 12. An upper surface of the bulging portion of the camera installation portion 12b constitutes a flow rectifying surface 18 (a flow rectifying portion) having a width substantially parallel to the vehicle width direction and extending substantially in a vehicle longitudinal direction. In other words, the flow rectifying surface 18 extends substantially in the vehicle width direction and the vehicle longitudinal direction. The flow rectifying surface 18 functions to form a flow of traveling wind toward a rear region of the recessed groove 17 in a side portion under the recessed groove 17 when the vehicle travels. It is preferable that the flow rectifying surface 18 be inclined upward toward the vehicle rear side.

Also, an upper wall of the lens installation portion 14 forming a rear region of the flow rectifying surface 18 forms an eave portion 14a extending toward the vehicle rear side with respect to the lens 16. An end portion of an inner side in the vehicle width direction of the eave portion 14a is joined to the outer surface of the housing main body 12a at the position under the recessed groove 17 while an end portion of the eave portion 14a on the housing main body 12a side extends toward the vehicle rear side to a position close to the visor 12c. Therefore, in the case of this embodiment, the flow rectifying surface 18 including an upper surface of the eave portion 14a extends toward the vehicle rear side to the position close to the visor 12c on a side portion of the housing main body 12a.

Also, a groove portion 19 extending substantially in a vertical direction is provided between a rear edge portion of the housing main body 12a and the visor 12c. The groove portion 19 is provided on an upper side with respect to the recessed groove 17 of the mirror housing 12 and a lower end thereof is continuous with the recessed groove 17. In addition, a rear end portion of the above-described eave portion 14a extends to a downward-extending position of the groove portion 19.

In the above configuration, when the mirror housing 12 receives a traveling wind of the vehicle in a state in which water droplets are adhered to the mirror housing 12, some of the water droplets that have adhered to the mirror housing 12 fall downward as it is and the remaining water droplets are separated from a rear end of the mirror housing 12 to be blown toward the vehicle rear side.

Here, conventionally, the rear region of the recessed groove 17 formed on the outer side surface of the mirror housing 12 is a region in which traveling wind easily stagnates, however, in the side mirror device 1 according to the embodiment, since the flow rectifying surface 18 for flowing the traveling wind to the rear region of the recessed groove 17 is provided close to a lower side of the recessed groove 17, the traveling wind vigorously flows to the rear region of the recessed groove 17 along the flow rectifying surface 18 as illustrated by the white arrow in FIG. 2. Therefore, generation of a vortex around the rear region of the recessed groove 17 caused by the traveling wind being vigorously introduced can be prevented beforehand.

Thus, as illustrated by the dotted arrow in FIG. 2, for example, even when water droplets are slightly introduced toward the lens 16 of the camera 15 after the water droplets that adhere to the mirror housing 12 are blown from a lower edge of a rear portion of the camera installation portion 12b to the vehicle rear side, the water droplets do not adhere to the lens 16. Also, not only the water droplets blown from the lower edge of the rear portion of the camera installation portion 12b but also water droplets transferred downward from an upper region of the mirror housing 12 are hindered from being introduced toward the lens 16 due to the traveling wind vigorously flowing to the rear region of the recessed groove 17.

In the side mirror device 1 according to the embodiment, since the flow rectifying surface 18 (the flow rectifying portion) which forms a flow of traveling wind toward the rear region of the recessed groove 17 (the recessed portion) is provided on the mirror housing 12 (between the rear region of the recessed groove 17 (the recessed portion) and the lens 16), an air current of the traveling wind when the vehicle travels is easily separated at a peripheral region of the lens 16 of the camera 15. Therefore, in the side mirror device 1 according to the embodiment, although the recessed groove 17 (the recessed portion) recessed in the inner side direction of the mirror housing 12 is on the vehicle rear side with respect to the lens 16 of the camera 15 installed toward the vehicle rear side, water droplets can be suppressed from being introduced toward an area of the lens 16 of the camera 15 when the vehicle travels.

Also, in the side mirror device 1 according to the embodiment, the camera installation portion 12b is provided to be continuous with the outer wall of the lower region of the housing main body 12a of the mirror housing 12, and the flow rectifying surface 18 is provided to have a width substantially parallel to the vehicle width direction and extend substantially in the vehicle longitudinal direction on an upper side with respect to the lens 16. Therefore, in the side mirror device 1 according to the embodiment, it is possible to efficiently prevent water droplets flowing down from the housing main body 12a side from being introduced toward the lens 16 due to the flow of the traveling wind along the flow rectifying surface 18 on the upper side with respect to the lens 16.

Further, in the side mirror device 1 according to the embodiment, the camera installation portion 12b is provided to bulge toward the outside in the vehicle width direction from the outer wall of the lower region 12a-u of the housing main body 12a of the mirror housing 12 such that the upper surface of the camera installation portion 12b becomes the flow rectifying surface 18 and the eave portion 14a is provided to extend toward the vehicle rear side with respect to the lens 16 at the rear end portion of the lens installation portion 14 which constitutes a portion of the flow rectifying surface 18. Therefore, in the side mirror device 1 according to the embodiment, an air current of the traveling wind can be more reliably separated from the vicinity of the lens 16 by the eave portion 14a, and further, it is possible to effectively prevent the water droplets that fall from the rear end of the camera installation portion 12b when the vehicle is stopped from adhering to the lens 16 due to the eave portion 14a.

Also, particularly, in the side mirror device 1 according to the embodiment, since the rear end portion of the eave portion 14a extends to the downward-extending position of the groove portion 19 between the visor 12c and the housing main body 12a, it is possible to effectively prevent water droplets flowing down along the groove portion 19 from being introduced toward the lens 16 by the eave portion 14a.

Next, a second embodiment illustrated in FIGS. 3 to 5 will be described.

Figure 3:
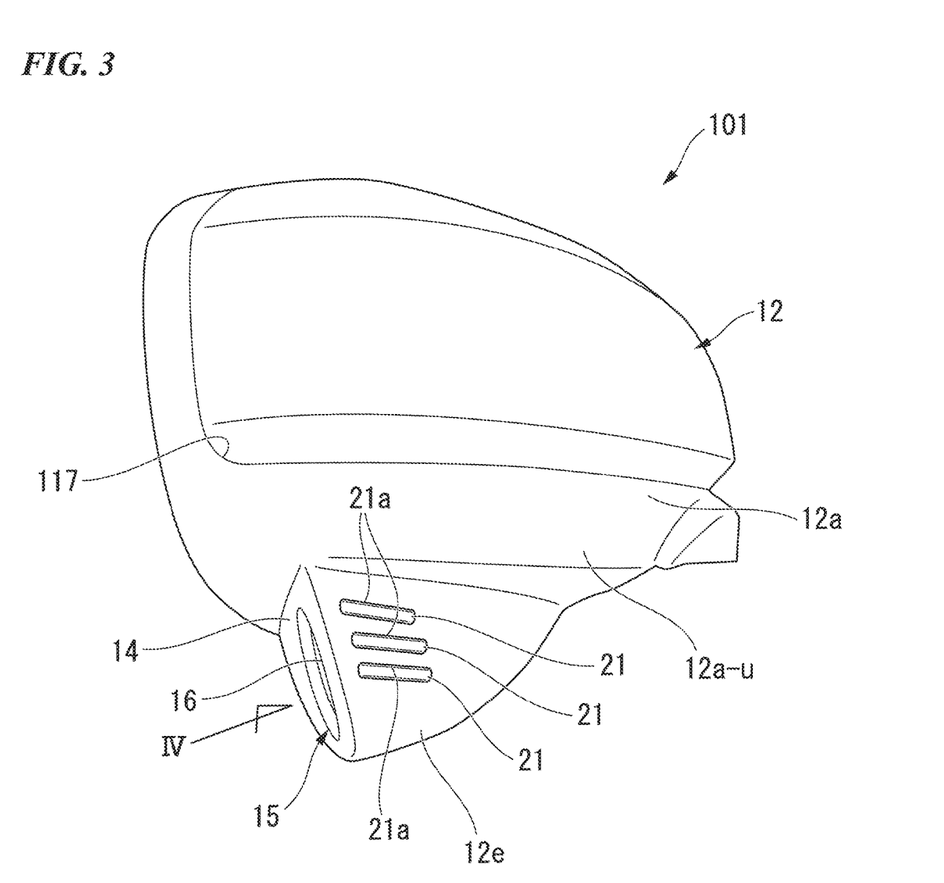
FIG. 3 is a side view of a side mirror device according to a second embodiment of the present invention.
Figure 4:
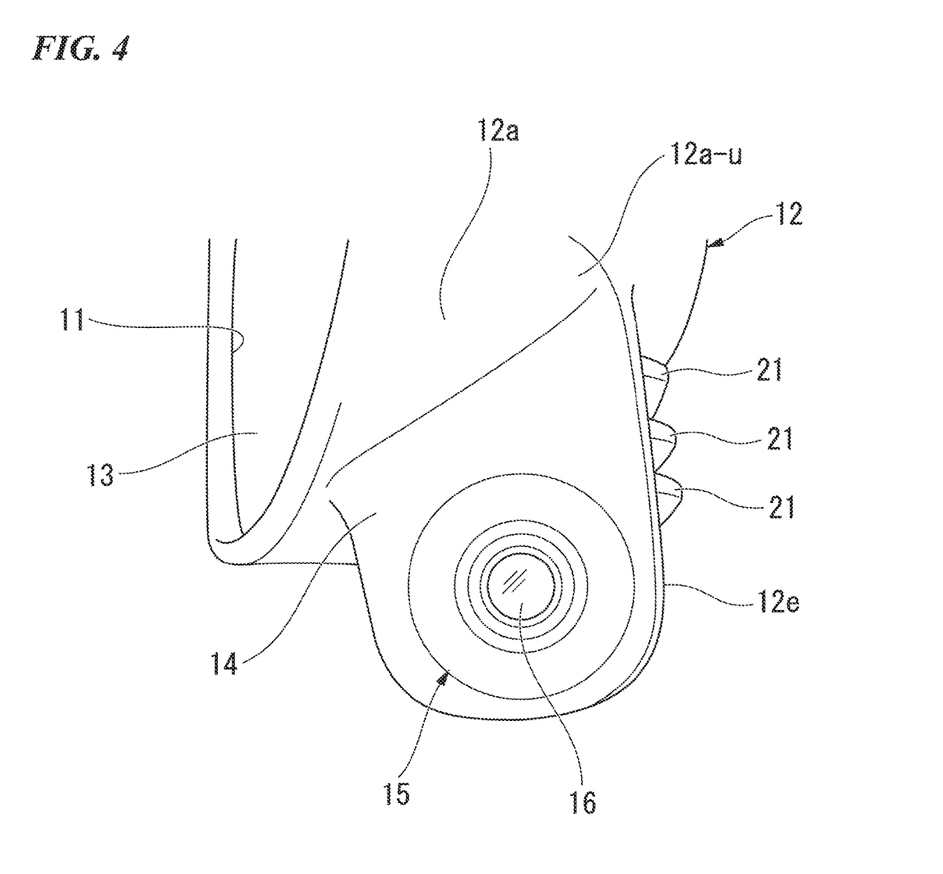
FIG. 4 is a view of a side mirror device according to the second embodiment of the present invention viewed in the direction of the arrow IV of FIG. 3.
Figure 5:
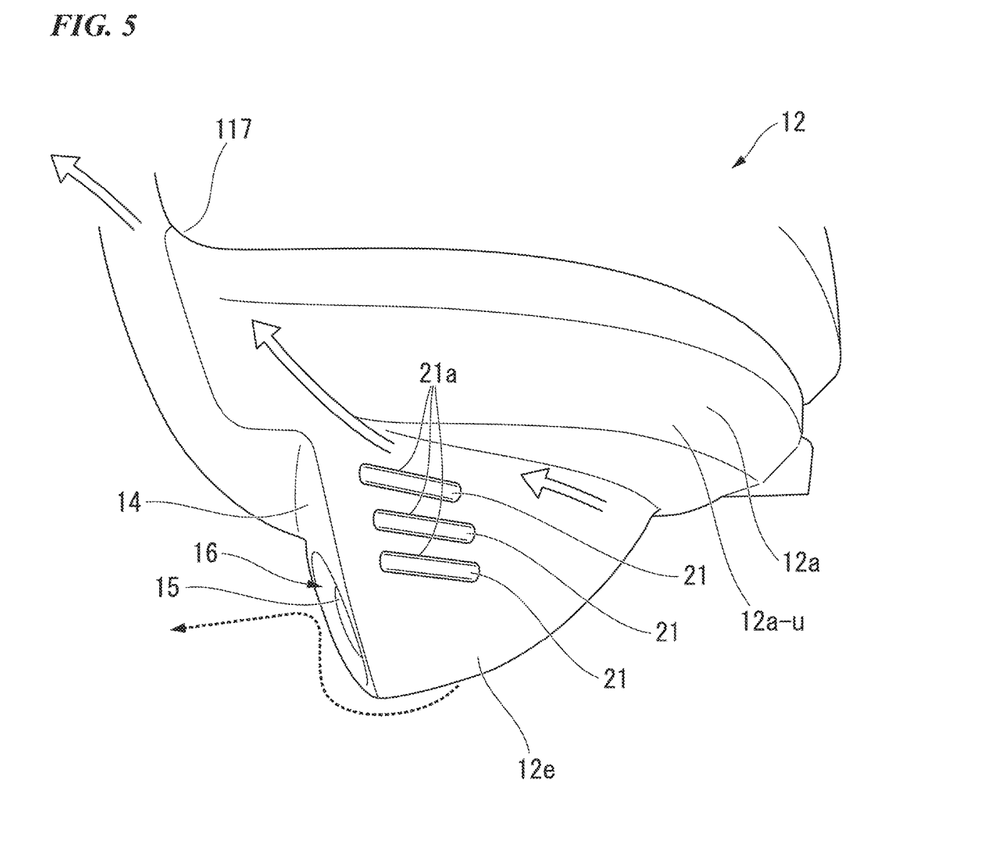
FIG. 5 is a side view of a part of a side mirror device according to the second embodiment of the present invention.

FIG. 3 is a view illustrating a side surface of a side mirror device 101 according to the second embodiment, FIG. 4 is a view corresponding to the arrow IV of FIG. 3, and FIG. 5 is a view illustrating partially enlarged side surface of the side mirror device 101.

As in the first embodiment, the side mirror device 101 according to the second embodiment includes a mirror housing 12 having an opening 11, a mirror main body 13 (a mirror body), and a camera 15 for imaging a side portion of the vehicle. While the mirror housing 12 includes a housing main body 12a and a camera installation portion 12e and the camera installation portion 12e is provided at a lower region 12a-u of the housing main body 12a as in the first embodiment, the camera installation portion 12e is formed not to bulge laterally from an outer wall of the lower region 12a-u of the housing main body 12a but to bulge downward from the outer wall of the lower region 12a-u of the housing main body 12a. In addition, a recessed portion 117 recessed in an inner side direction from an outer surface of the mirror housing 12 is provided at a position on a vehicle rear side with respect to a lens 16 of the camera 15 in an outer side surface of the housing main body 12a.

Three flow rectifying fins 21 which form flow rectifying surfaces 21a whose upper surfaces have a width substantially parallel to a vehicle width direction and extend substantially in a vehicle longitudinal direction are provided to protrude on an outer side surface of the camera installation portion 12e. The flow rectifying fins 21 are provided to protrude on a side surface of the camera installation portion 12e such that each of the flow rectifying surfaces 21a is formed to be inclined upward toward the vehicle rear side and they are substantially parallel to each other. In the embodiment, the flow rectifying surfaces 21a of the flow rectifying fins 21 constitute a flow rectifying portion which forms a flow of traveling wind toward the recessed portion 117 when the vehicle travels. In addition, each of the flow rectifying fins 21 is disposed on an upper side with respect to the lens 16 of the camera 15 as illustrated in FIGS. 4 and 5.

In the side mirror device 101 according to the second embodiment, the flow rectifying fin 21 is provided to vigorously flow the traveling wind to the recessed portion 117 in which traveling wind of the housing main body 12a easily stagnates. Thus, traveling wind vigorously flows to the recessed portion 117 along the flow rectifying fin 21 as illustrated by the white arrow in FIG. 5 when the vehicle travels. Thereby, generation of vortex around the recessed portion 117 due to the traveling wind being introduced vigorously is prevented beforehand.

Therefore, as illustrated by the dotted arrow in FIG. 5, for example, even when the water droplets are slightly introduced toward the lens 16 of the camera 15 after the water droplets that adhere to the mirror housing 12 are blown from a lower edge of a rear portion of the camera installation portion 12e to the vehicle rear side, the water droplets do not adhere to the lens 16. Also, water droplets transferred downward from the upper region of the mirror housing 12 are hindered from being introduced toward the lens 16 due to the traveling wind vigorously flowing toward the recessed portion 117.

Further, in the side mirror device 101 according to the second embodiment, since the flow rectifying surface 21a of the flow rectifying fins 21 is formed to be inclined upward toward the vehicle rear side, when traveling wind of the vehicle flows along the flow rectifying surface 21a, the flow is directed toward an inclined upper side of the housing main body 12a. Water droplets flowing down from an upper side of the mirror housing 12 can be blown in a direction away from the lens 16 and an air current of traveling wind can be more reliably separated from the vicinity of the lens 16.

In addition, it is to be noted that the present invention is not limited to the embodiments described above, and various modifications can be made in design without departing from the spirit or scope of the present invention.

REFERENCE SIGNS LIST 1, 101 Side mirror device
11 Opening
12 Mirror housing
12a Housing main body
12b, 12e Camera installation portion
12c Visor (opening cover wall)
13 Mirror main body
14a Eave portion
15 Camera
16 Lens
17 Recessed groove (recessed portion)
18, 21a Flow rectifying surface (flow rectifying portion)
19 Groove portion
117 Recessed portion

The invention claimed is:

1. A side mirror device for a vehicle comprising:
a mirror main body which reflects a vehicle rear side;
a mirror housing disposed on a side portion of an outer side of the vehicle and having an opening opened toward the vehicle rear side to accommodate the mirror main body; and
a camera disposed in a camera installation portion provided on the mirror housing and configured to image an outside of the vehicle through a lens directed toward the vehicle rear side,
wherein:
a recessed portion is provided on an outer side surface in a vehicle width direction of the mirror housing, the recessed portion extending from the vehicle rear side with respect to the lens in a vehicle longitudinal direction and recessed in an inner side direction from an outer surface of the mirror housing;
a flow rectifying portion which rectifies a flow of traveling wind is provided on the mirror housing;
the camera installation portion is formed to be continuous with an outer wall of a lower region of the mirror housing;
the flow rectifying portion includes a flow rectifying surface having a width substantially parallel to the vehicle width direction and extending substantially in the vehicle longitudinal direction on an upper side in a vehicle height direction with respect to the lens, the vehicle height direction being perpendicular to the vehicle width direction and the vehicle longitudinal direction; and
the flow rectifying surface is positioned below the recessed portion in the vehicle height direction.

2. The side mirror device for a vehicle according to claim 1, wherein:
the camera installation portion bulges to an outer side in the vehicle width direction from the outer wall of the lower region of the mirror housing;
the flow rectifying surface is provided on an upper portion in the vehicle height direction of a bulging portion of the camera installation portion; and
an eave portion extends toward the vehicle rear side in the vehicle longitudinal direction with respect to the lens and is provided at a rear end portion in the vehicle longitudinal direction of the bulging portion, which forms the flow rectifying surface.

3. The side mirror device for a vehicle according to claim 2, wherein:
the mirror housing includes an opening cover wall, which forms a peripheral edge portion of the opening, and a groove portion adjacent to a vehicle front side in the vehicle longitudinal direction of the opening cover wall and configured to extend in a vertical direction substantially parallel to the vehicle height direction; and
a rear end portion of the eave portion extends to a downward-extending position of the groove portion in the vehicle height direction.

4. The side mirror device for a vehicle according to claim 1, wherein the flow rectifying surface is constituted with an inclined surface inclined upward in the vehicle height direction toward the vehicle rear side.

5. The side mirror device for a vehicle according to claim 2, wherein the flow rectifying surface is constituted with an inclined surface inclined upward in the vehicle height direction toward the vehicle rear side.

6. The side mirror device for a vehicle according to claim 3, wherein the flow rectifying surface is constituted with an inclined surface inclined upward in the vehicle height direction toward the vehicle rear side.

* * * * *